(12) United States Patent
Yoshida et al.

(10) Patent No.: US 10,152,406 B2
(45) Date of Patent: Dec. 11, 2018

(54) SOFTWARE PROGRAM REPAIR

(71) Applicant: FUJITSU LIMITED, Kawasaki-shi, Kanagawa (JP)

(72) Inventors: Hiroaki Yoshida, Cupertino, CA (US); Shin Hwei Tan, Sunnyvale, CA (US); Mukul R. Prasad, San Jose, CA (US)

(73) Assignee: FUJISTU LIMITED, Kawasaki (JP)

( * ) Notice: Subject to any disclaimer, the term of this patent is extended or adjusted under 35 U.S.C. 154(b) by 101 days.

(21) Appl. No.: 14/835,561

(22) Filed: Aug. 25, 2015

(65) Prior Publication Data
US 2017/0060735 A1    Mar. 2, 2017

(51) Int. Cl.
    *G06F 9/44*     (2018.01)
    *G06F 11/36*    (2006.01)
    *G06F 8/71*     (2018.01)

(52) U.S. Cl.
    CPC ............ *G06F 11/3688* (2013.01); *G06F 8/71* (2013.01)

(58) Field of Classification Search
    CPC ................ G06F 7/78; G06F 8/00–8/78; G06F 9/44–9/455; G06F 11/36
    See application file for complete search history.

(56) References Cited

U.S. PATENT DOCUMENTS

| | | | | |
|---|---|---|---|---|
| 6,530,079 B1 * | 3/2003 | Choi | ......................... | G06F 9/52 712/227 |
| 6,851,105 B1 * | 2/2005 | Coad | ........................ | G06F 8/20 717/106 |
| 2004/0221270 A1 * | 11/2004 | Witchel | ..................... | G06F 8/71 717/124 |
| 2004/0225996 A1 * | 11/2004 | Venkatesan | ............. | G06F 8/658 717/100 |
| 2010/0058262 A1 * | 3/2010 | Morizawa | ........... | G06F 17/5009 716/106 |
| 2011/0265064 A1 * | 10/2011 | Hadar | ............... | G06F 17/30985 717/121 |
| 2013/0055221 A1 * | 2/2013 | Murthy | ............... | G06F 11/3608 717/132 |
| 2013/0318540 A1 * | 11/2013 | Kumura | .................... | G06F 9/46 718/106 |

(Continued)

OTHER PUBLICATIONS

Trcka et al., Data flow anti patterns discovering data flow errors in workflows, 2009 (Year: 2009).*

(Continued)

*Primary Examiner* — Brian W Wathen
*Assistant Examiner* — Zhan Chen
(74) *Attorney, Agent, or Firm* — Maschoff Brennan

(57) ABSTRACT

According to an aspect of an embodiment, one or more systems or methods may be configured to locate a fault in a software program using a test suite. The systems or methods may be further configured to modify, using a repair template, the software program in response to locating the fault. In addition, the systems or methods may be configured to determine whether the modification satisfies an anti-pattern condition. The anti-pattern condition may indicate whether the modification is improper. The systems or methods may also be configured to disallow the modification in response to the modification satisfying the anti-pattern condition or perform further testing on the software program, as modified, in response to the modification not satisfying the anti-pattern condition.

11 Claims, 8 Drawing Sheets

(56) References Cited

U.S. PATENT DOCUMENTS

| | | | | |
|---|---|---|---|---|
| 2013/0332904 A1* | 12/2013 | Howard | ................... | G06F 8/20 717/123 |
| 2013/0339929 A1* | 12/2013 | Logozzo | ............. | G06F 9/44589 717/124 |
| 2015/0370560 A1* | 12/2015 | Tan | ................... | G06F 9/30058 717/148 |
| 2016/0188435 A1* | 6/2016 | Abadi | ................... | G06F 8/443 717/106 |
| 2016/0378648 A1* | 12/2016 | Ekambaram | ........ | G06F 11/3692 714/38.1 |

OTHER PUBLICATIONS

Liu et al., Formulating the data flow modeling and verification for workflow a petri net based approach, 2014 (Year: 2014).*

Besson et al., Model checking security properties of control flow graphs, 2005 (Year: 2005).*

C. Le Goues et al., "GenProg: A Generic Method for Automatic Software Repair," IEEE Transactions on Software Engineering, vol. 38, No. 1, Jan./Feb. 2012.

T. Nguyen, et al., "SemFix: Program Repair via Semantic Analysis," in International Conference on Software Engineering, ser. ICSE, 2013.

D. Kim, et al., "Automatic Patch Generation Learned from Human-Written Patches," The Hong Kong University of Science and Technology, China, 2013.

DeMarco et al., "Automatic Repair of Buggy If Conditions and Missing Preconditions with SMT," In Proceedings of the 6th International Workshop on Constraints in SoftwareTesting, Verification, and Analysis, CSTVA 2014. ACM, 2014.

Kaleeswaran, et al., "MintHint: Automated Synthesis of Repair Hints," International Conference on Software Engineering, ser. ICSE 2014. ACM, 2014.

S. H. Tan and A. Roychoudhury, "Relifix: Automated repair of software regressions," in International Conference on Software Engineering, ser. ICSE 2015, 2015.

S. Mechtaev, J. Yi, and A. Roychoudhury, "Directfix: Looking for simple program repairs," in International Conference on Software Engineering, ser. ICSE '15, 2015.

Z. Qi, F. Long, S. Achour, and M. Rinard. Efficient automatic patch generation and defect identification in kali. In International Symposium on Software Testing and Analysis (ISSTA), Jul. 2015.

F. Long et al., Staged Program Repair in SPR. Symposium on the Foundations of Software Engineering, FSE Mar. 11, 2015.

* cited by examiner

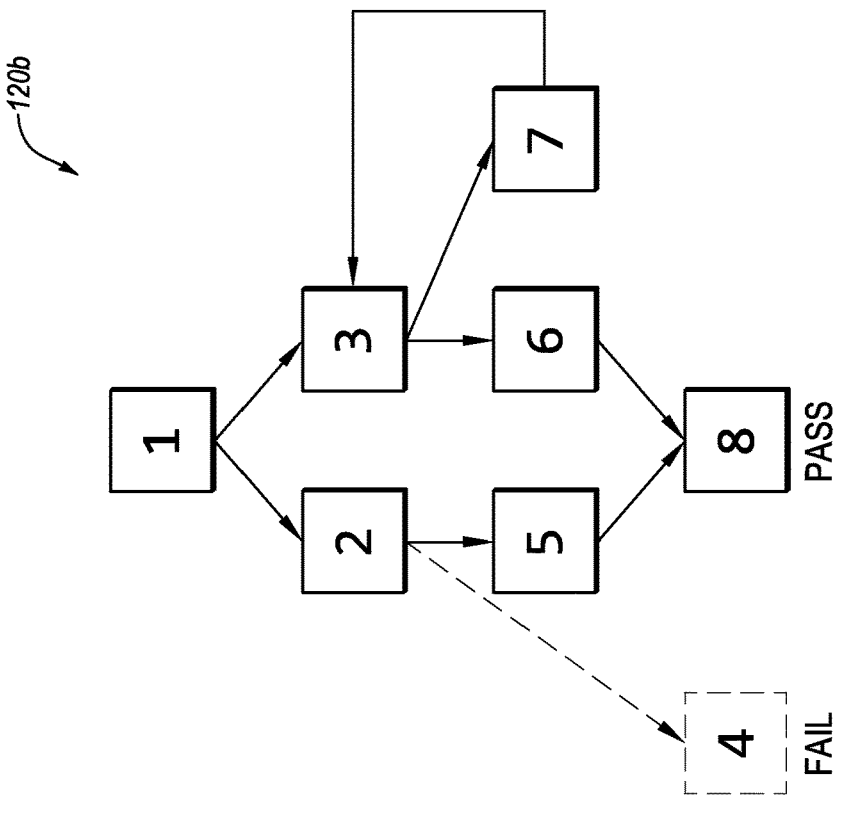

SOFTWARE PROGRAM REPAIR

FIELD

The embodiments discussed in the present disclosure are related to software program repair.

BACKGROUND

Software programs often have faults in them (commonly referred to as "bugs") in which they may not operate as intended. Often automated repair systems are used in attempts to identify and correct faults in software programs.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

According to an aspect of an embodiment, one or more systems or methods may be configured to locate a fault in a software program using a test suite. The systems or methods may be further configured to modify, using a repair template, the software program in response to locating the fault. In addition, the systems or methods may be configured to determine whether the modification satisfies an anti-pattern condition. The anti-pattern condition may indicate whether the modification is improper. The systems or methods may also be configured to disallow the modification in response to the modification satisfying the anti-pattern condition or perform further testing on the software program, as modified, in response to the modification not satisfying the anti-pattern condition.

The objects and advantages of the embodiments will be realized and achieved at least by the elements, features, and combinations particularly pointed out in the claims.

Both the foregoing general description and the following detailed description are given as examples and are explanatory and are not restrictive of the invention, as claimed.

BRIEF DESCRIPTION OF THE DRAWINGS

Example embodiments will be described and explained with additional specificity and detail through the use of the accompanying drawings in which:

FIG. 1C illustrates an example modified control-flow graph of modified code under test and an example modified portion of the modified code under test that may correspond to the modified control-flow graph;

DESCRIPTION OF EMBODIMENTS

Some embodiments described in the present disclosure relate to methods and systems of repairing software programs. Software programs often include faults (also commonly referred to as "bugs") that may cause the software programs to behave in an unintended manner. Additionally, automated repair systems and techniques are often used to detect and correct faults to repair software programs. However, commonly used automated repair systems and techniques often make modifications to software programs in attempts to fix faults that do not appropriately repair the fault in the software program.

According to one or more embodiments described in the present disclosure, modifications of a software program that may act as repair candidates of the software program may be analyzed. The analysis may be used to determine whether or not the modifications may be improper in that they may not correspond to a correct repair for the fault at hand. This determination may be made by checking if the modifications correspond to improper (e.g., unrealistic or dramatic) modifications of the software program's behavior, and thus may be unlikely to correspond to a correct repair for a fault. The modifications may be disallowed in response to determining that they satisfy such criteria.

Specifically, in some embodiments, it may be determined whether a modification satisfies an anti-pattern condition (referred to in the present disclosure as an "anti-pattern" or "anti-patterns") that may indicate whether the modification is improper or that may provide an indication as to whether the modification may correspond to a correct repair of the fault. In some embodiments, satisfaction of the anti-pattern by the modification may indicate that the modification is improper. By comparison, not satisfying the anti-pattern may provide confidence to submit the modification for further analysis. Conversely, in response to the modification not satisfying the anti-pattern, further testing may be performed on the software program, as modified. The above-mentioned allowance or disallowance of a modification may be performed based on static analysis such that it may be performed before a test suite is run with respect to the software program, as modified. The static analysis and may reduce unnecessary processing and improve the efficiency of repairing software programs. For at least the reasons described above, the systems and method described in the present disclosure may help improve automatic testing and repair of software programs.

Embodiments of the present disclosure are explained with reference to the accompanying drawings.

Figure 1A:
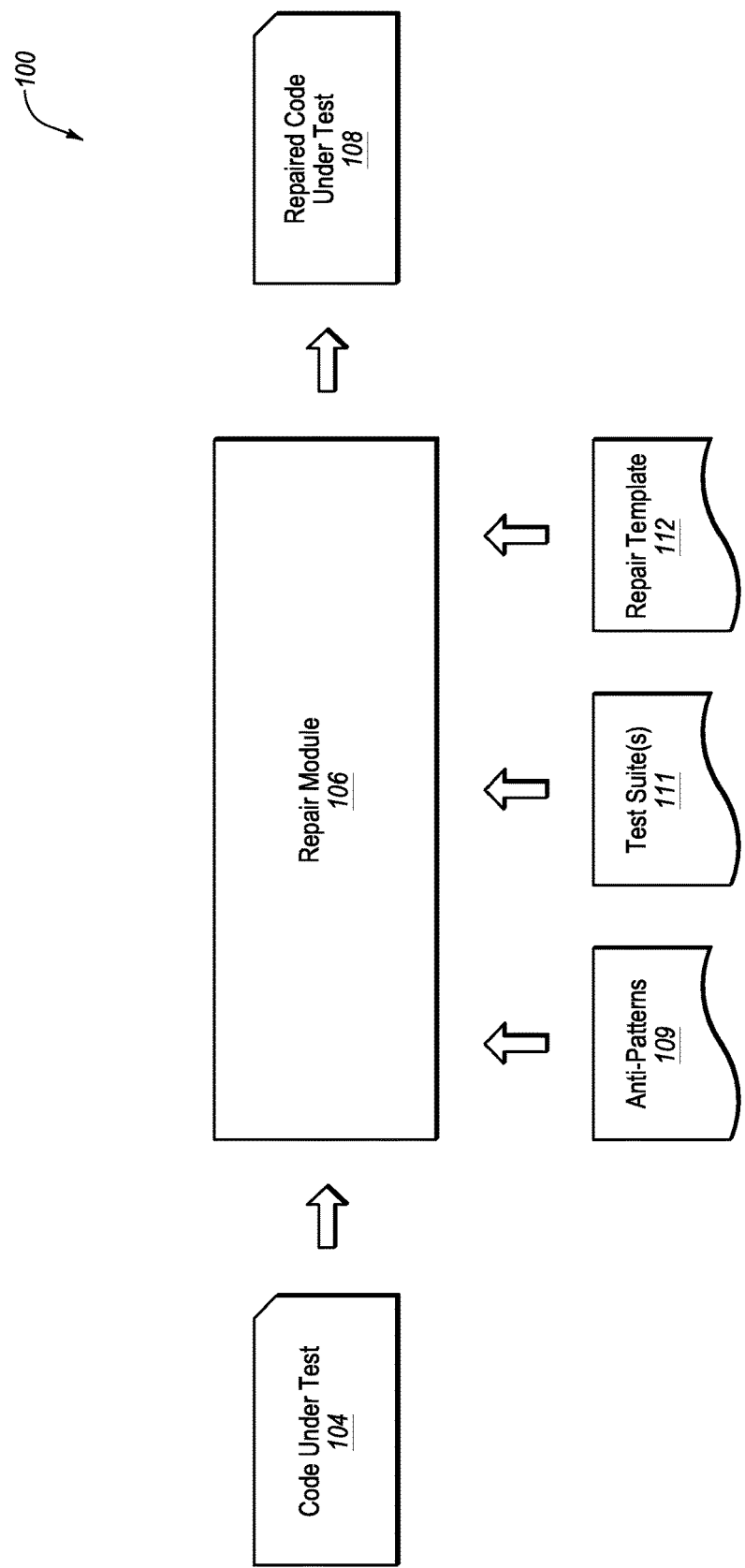
FIG. 1A is a diagram representing an example environment related to repairing a software program.

FIG. 1A is a diagram representing an example environment 100 related to repairing a software program, arranged in accordance with at least one embodiment described in the present disclosure. The environment 100 may include a repair module 106 configured to analyze code under test 104 for faults. The repair module 106 may also be configured to repair this fault output modified code under test 108, which may include one or more modifications as compared to the code under test 104 that may repair one or more faults in the code under test 104.

The code under test 104 may include electronic data, such as, for example, the software program, code of the software program, libraries, applications, scripts, or other logic or instructions for execution by a processing device. In some embodiments, the code under test 104 may include a complete instance of the software program. Additionally or alternatively, the code under test 104 may include a portion of the software program. The code under test 104 may be written in any suitable type of computer language that may be used for the software program.

The repair module 106 may include code and routines configured to enable a computing device to perform one or more modifications of the code under test 104 to generate the modified code under test 108. Additionally or alternatively, the repair module 106 may be implemented using hardware including a processor, a microprocessor (e.g., to perform or control performance of one or more operations), a field-programmable gate array (FPGA), or an application-specific integrated circuit (ASIC). In some other instances, the repair module 106 may be implemented using a combination of hardware and software. In the present disclosure, operations described as being performed by the repair module 106 may include operations that the repair module 106 may direct a corresponding system to perform.

The repair module 106 may be configured to perform a series of operations with respect to the code under test 104 that may be used to repair (also referred to as correct) one or more faults in the code under test 104. In some embodiments, the repair module 106 may be configured to perform one or more of the repair operations based on a repair template 112, one or more test suites 111, and one or more anti-patterns 109.

The repair template 112 may include any suitable type of instructions or routines that, when executed, may be configured to implement one or more modifications with respect to the code under test 104 in response to the presence of faults in the code under test 104. The modifications may include changes in the code under test 104 that may repair or attempt to repair the faults.

As indicated above, the anti-patterns 109 may provide indications as to whether a modification is improper (e.g., when the modification satisfies one or more anti-patterns 109). Additionally or alternatively, the anti-patterns 109 may help provide confidence that the modification corresponds to a correct repair (e.g., when the modification does not satisfy any of the anti-patterns 109) such that further testing on the modification may be performed. As detailed below, modifications of the types that may satisfy one or more of the anti-patterns 109 may be disallowed because satisfaction may indicate that the corresponding modifications are improper.

In some embodiments, the anti-patterns 109 may be based on or may include software program control-flow changes that may result from improper modifications. For example, in some embodiments one or more anti-patterns 109 may be based on or may include a deletion of an exit path of a control-flow block of a software program. In particular, in some embodiments, one or more anti-patterns 109 may be based on or may include deletion of a "return" statement of the software program, deletion of an "exit" statement of the software program, deletion of a statement of the software program that includes a method call with a name that matches a regular expression, or deletion of an "assert" statement of the software program. In these or other embodiments, one or more anti-patterns 109 may be based on or may include deletion of an exit path of a control-flow graph ("control-flow graph exit path") in which the deletion may be caused by a modification.

Figure 1B:
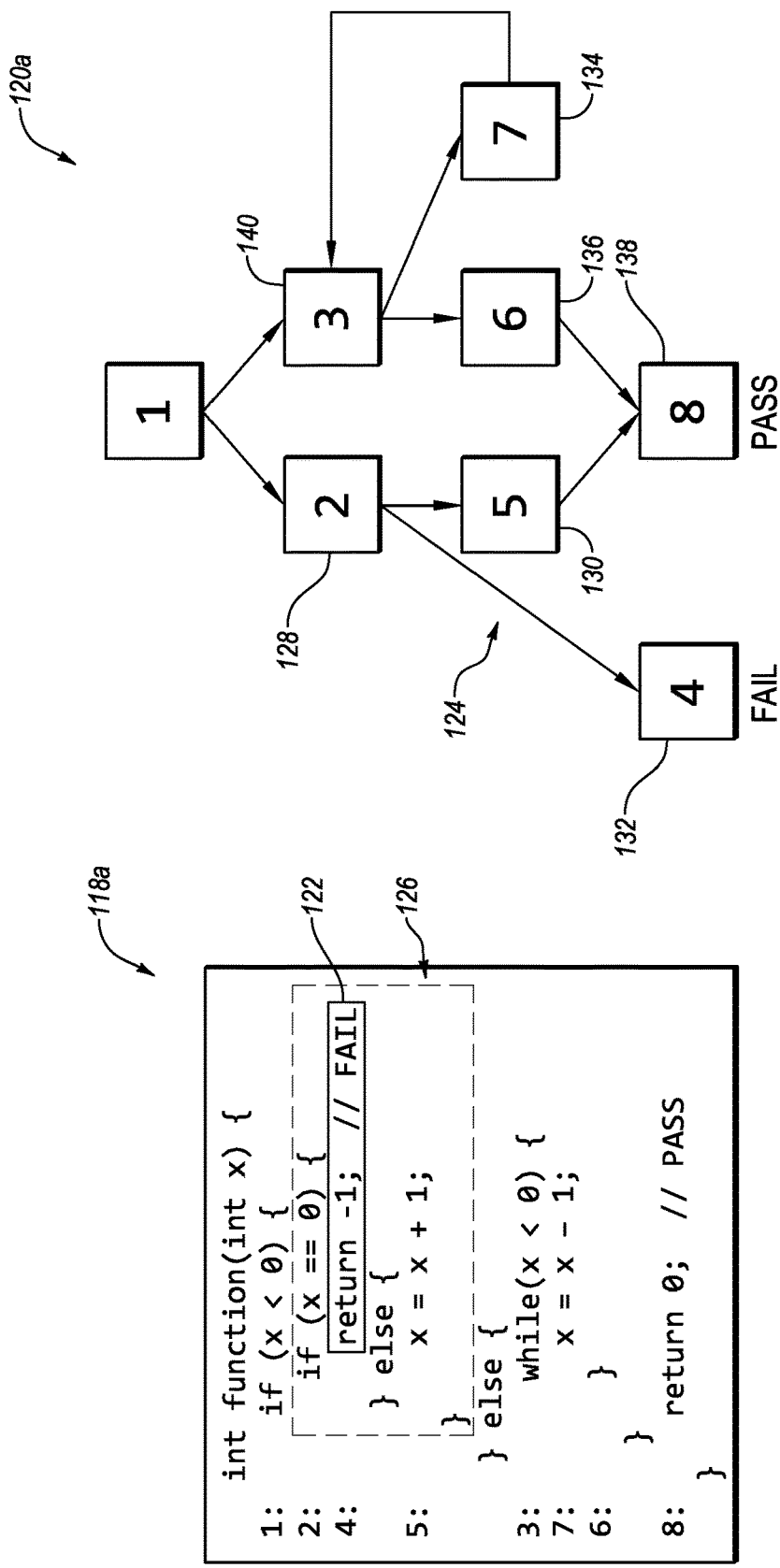
FIG. 1B illustrates an example control-flow graph of code under test and an example portion of the code under test that may correspond to the control-flow graph.

By way of example, FIG. 1B illustrates an example control-flow graph 120a that may be generated for the code under test 104 prior to a modification of the code under test 104. The control-flow graph 120a may correspond to an example portion 118a of the code under test 104. Further, FIG. 1C illustrates an example control-flow graph 120b that may be generated for the code under test 104 after a modification that may delete a return statement 122 of the portion 118a. The deletion of the return statement 122 is indicated in a modified portion 118b of FIG. 1C. In the particular example, the modification may be such that an exit path 124 of the control-flow graph 120a may not be included in the control-flow graph 120b. As such, the modification in this particular example may result in deletion of the exit path 124. In the illustrated example, the dotted lines in the control-flow graph 120b indicate that the corresponding nodes and edges were in the control-flow graph 120a but are no longer in the control-flow graph 120b because of the modification. As explained below, the modification that results in the change from the control-flow graph 120a to the control-flow graph 120b may be disallowed because it satisfies a particular anti-pattern of deleting an exit path of a control-flow graph.

As another example, in some embodiments one or more anti-patterns 109 may be based on or may include a deletion of all the statements in a control-flow block that may correspond to a node of a control-flow graph ("control-flow graph node"). Additionally or alternatively, one or more anti-patterns 109 may be based on or may include modifications that may be semantically equivalent to deletion of all the statements that may correspond to a node of a control-flow graph. For example, in some embodiments, one or more anti-patterns 109 may be based on addition of a negation of a predicate of a path condition (e.g., resulting in path conditions such as "C&&!C" or "C||!C"), addition of a "true" predicate that disables a check of a condition, or addition of a "false" predicate that disables a condition because each of these may result in not entering a portion of code that may correspond to a node of a control-flow graph. As such, in these or other embodiments, the anti-patterns 109 may be based on or may include deletion of a control-flow graph node, in which the deletion may be caused by a modification.

Figure 1D:
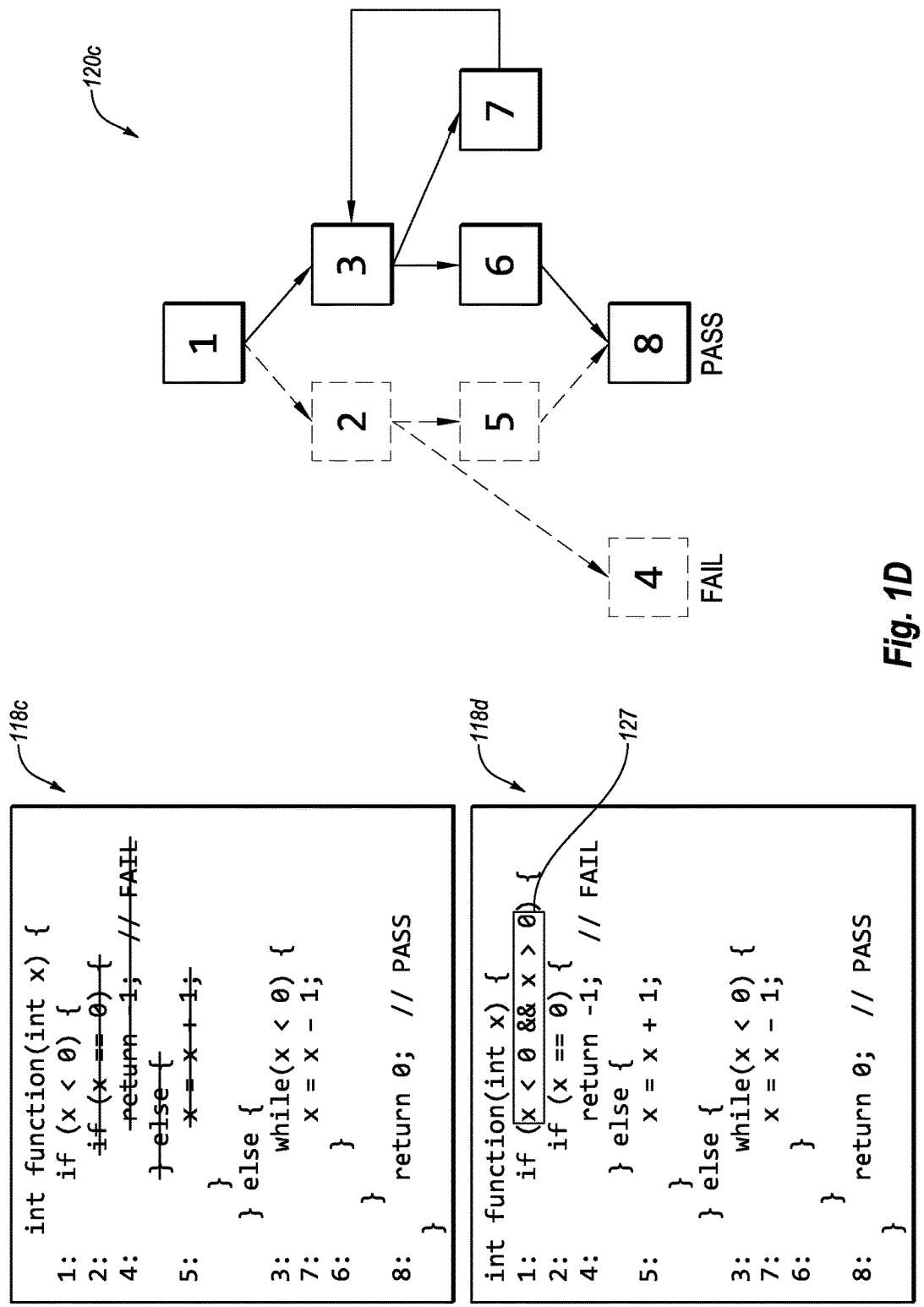
FIG. 1D illustrates another example modified control-flow graph of modified code under test and other examples of modified portions of the modified code under test that may correspond to the modified control-flow graph.

By way of example, FIG. 1D illustrates an example control-flow graph 120c that may be generated for the code under test 104 after a modification of the code. In the particular example, the modification may be such that control-flow graph nodes 128, 130, and 132 of the control-flow graph 120a may not be included in the control-flow graph 120c. In some embodiments, the modification may be such that all the statements of a control-flow block 126 of the portion 118a of FIG. 1B may be deleted. The deletion of the statements of the control-flow block 126 is indicated in a modified portion 118c of FIG. 1D.

Additionally or alternatively, the modification may semantically act as a deletion of the statements of the control-flow block 126 by not allowing entrance into the control-flow block 126. An example of such a modification is illustrated by a condition 127 that may be included in a modified portion 118d of FIG. 1E and that may not be included in the portion 118a of FIG. 1B.

The modification in this particular example may result in deletion of the control-flow graph nodes 128, 130, and 132. In the illustrated example, the dotted lines in the control-flow graph 120c indicate that the corresponding nodes and edges were in the control-flow graph 120a but are no longer in the control-flow graph 120c because of the modification. As explained below, a modification that results in the change from the control-flow graph 120a to the control-flow graph 120c may be disallowed because it satisfies a particular anti-pattern of deleting one or more control-flow graph nodes.

As another example, in some embodiments one or more anti-patterns 109 may be based on or may include modifications that may cause a premature return out of control-flow block of a software program. For example, in some embodiments, one or more anti-patterns 109 may be based on or may include an insertion of a "return" statement (e.g., "return (void)" or "return (const)") in a control-flow block in which the inserted "return" statement is not a last statement in the control-flow block. In these or other embodiments, the anti-patterns 109 may be based on or may include insertion of a control-flow graph return path prior to a return node of a previous control-flow graph, in which the insertion may be caused by a modification.

Figure 1E:
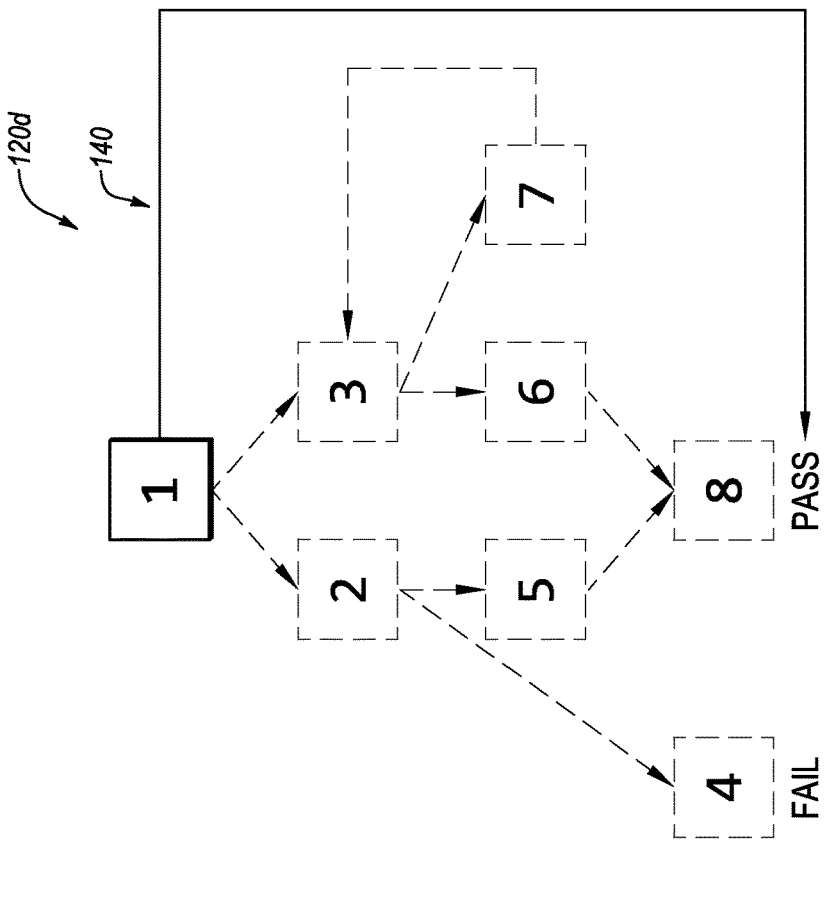
FIG. 1E illustrates another example modified control-flow graph of modified code under test and another example modified portion of the modified code under test that may correspond to the modified control-flow graph.

By way of example, FIG. 1E illustrates an example control-flow graph 120d that may be generated for the code under test 104 after a modification of the code under test 104. In the particular example, the modification may be such that a control-flow graph return path 140 may be included in the control-flow graph 120d whereas it was not previously included in the control-flow graph 120a. As illustrated by a comparison between the control-flow graph 120a and the control-flow graph 120d, the control-flow graph return path 140 may be inserted before return nodes 132 and 138 of the control-flow graph 120a. An example of such a modification is illustrated by a statement 129 that may be included in a modified portion 118e of FIG. 1E that may not be included in the portion 118a of FIG. 1B.

The modification in this particular example may result in skipping of code portions that may correspond to control-flow graph nodes 128, 130, 134, 136, and 140 of the control-flow graph 120a. In the illustrated example, the dotted lines in the control-flow graph 120d indicate that the corresponding nodes and edges were in the control-flow graph 120a but are no longer in the control-flow graph 120d because of the modification. As explained below, the modification that results in the change from the control-flow graph 120a to the control-flow graph 120d may be disallowed because it satisfies a particular anti-pattern of inserting a control-flow graph return path prior to a return node of a previous control-flow graph.

The anti-patterns 109 described above with respect to control-flow changes that may be disallowed are given as examples and other anti-patterns 109 related to changes in the control-flow may be within the scope of the present disclosure. Further, the anti-patterns 109 are not mutually exclusive such that a modification that satisfies one anti-pattern may also satisfy one or more other anti-patterns in some instances.

Additionally or alternatively, in some embodiments, one or more of the anti-patterns 109 may be based on or may include software program data-flow changes that may result from improper modifications. For example, in some embodiments one or more anti-patterns 109 may be based on or may include the disabling of data-flow branches that may be caused by a modification. In particular, in some embodiments, one or more anti-patterns 109 may be based on or may include the deletion of a variable definition such that a corresponding variable is undefined at a later use.

With respect to a data-flow graph, the deletion of a variable definition as described may be such that an incoming edge of a data-flow node may be deleted. As such, in some embodiments, one or more anti-patterns 109 may be based on or may include deletion of an incoming edge of a data-flow node. As explained further below, a modification that results in deletion of an incoming edge of a data-flow node may be disallowed.

Figure 1F:
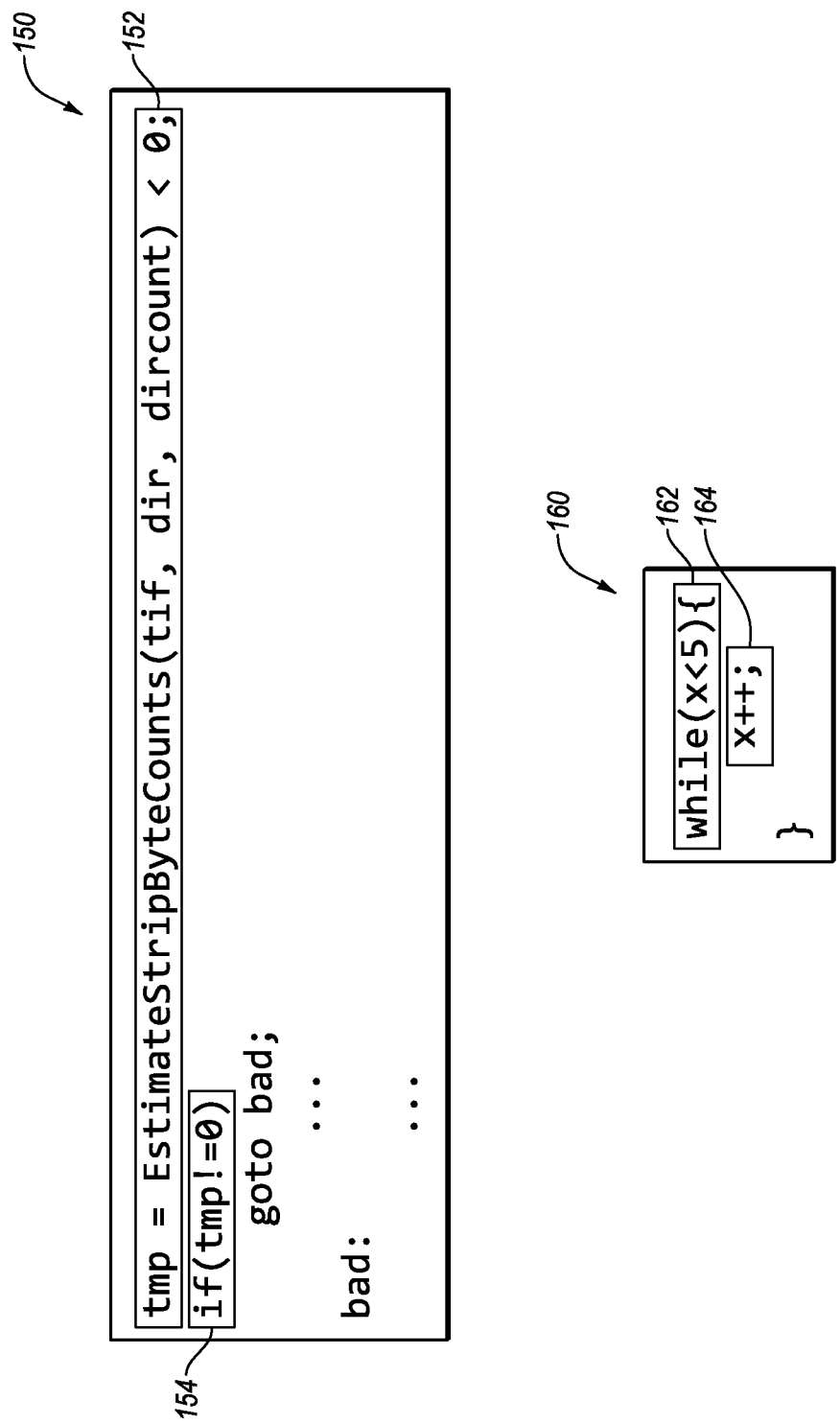
FIG. 1F illustrates example code that may have data-flow modifications performed thereon.

By way of example, FIG. 1F illustrates example code 150 that may include a statement 152 and a statement 154. The statement 152 may define a variable "tmp" that may be used at the statement 154. A corresponding data-flow graph may include a first node that corresponds to definition of "tmp" at the statement 152 and a second node that corresponds to use of "tmp" at the statement 154, in which an edge may point from the first node to the second node. The edge pointing from the first node to the second node may be considered an "incoming edge" with respect to the second node. A deletion of the statement 152 may satisfy an anti-pattern because it may delete the definition of "tmp" such that "tmp" may be undefined when used at the statement 154. In terms of the corresponding data-flow graph, deletion of the statement 152 may result in deletion of the first node and the edge connecting the first node and the second node such that an incoming edge of the corresponding data-flow graph may be deleted. As such, deletion of the statement 152 may be disallowed because it may satisfy a particular anti-pattern of deletion of an incoming edge of a data-flow node.

Additionally or alternatively, in one or more embodiments, one or more anti-patterns 109 may be based on or may include modifications that may result in infinite loops. In particular, in some embodiments, one or more anti-patterns 109 may be based on or may include the deletion of an assignment statement of a loop variable inside of a loop, in which a loop condition of the loop is based on the loop variable that may correspond to the assignment statement.

With respect to a data-flow graph, the deletion of an assignment statement as described may be such that a particular type of data-flow loop of a corresponding data-flow graph may be broken. The particular type of data-flow loop may be a data-flow loop that includes a first data-flow node and a second data-flow node. The first data-flow node may correspond to a loop condition statement of a loop of the software program and the second data-flow node may correspond to an assignment statement that is within the loop of the software program. In addition, the second data-flow node may be related to a loop variable of the loop condition statement that may correspond to the first data-flow node. As explained further below, a modification that results in breaking of such a data-flow loop may be disallowed because it may satisfy a particular anti-pattern.

By way of example, FIG. 1F illustrates example code 160 that may include a statement 162 and a statement 164. The code 160 may correspond to a "while" loop. The statement 162 may include a loop condition statement, in which the loop condition may be based on a loop variable "x". In particular, as long as "x" is less than "5", the execution of the code 160 may remain in the "while" loop. The statement 164 may include an assignment statement that may increment the loop variable "x" and the statement 164 may be inside of the "while" loop of the code 160. As such, satisfaction of the loop condition associated with the statement 162 is based on values of "x" that may be assigned by the statement 164 within the corresponding "while" loop.

A corresponding data-flow graph may include a first node that corresponds to the use of "x" at the statement 162 and a second node that corresponds to assignment of "x" at the statement 164. Additionally, the corresponding data-flow graph may include a first edge from the first node to the second node and a second edge from the second node back to the first node because of the relational use and assignment of "x" in the statements 162 and 164.

A deletion of the statement 164 may satisfy an anti-pattern because it may result in never leaving the "while" loop of the code 160. In terms of the corresponding data-flow graph, deletion of the statement 164 may result in deletion of the second edge of the corresponding data-flow graph. Deletion of the second edge may break the data-flow loop between the first node and the second node. As such, deletion of the statement 164 may be disallowed because it may satisfy the particular anti-pattern of breaking of the particular type of data-flow loop described above.

The test suites 111 may include one or more routines that may act as test cases for the code under test 104. The test suites 111 may be configured to determine whether the code under test 104 behaves in a specified manner. The test suites 111 may be configured according to any suitable technique.

The repair module 106 may be configured to apply one or more of the test suites 111 with respect to the code under test 104 to detect or determine one or more faults in the code under test 104. The repair module 106 may also be configured to implement one or more modifications with respect to the code under test 104 based on the repair template 112 and in response to and based on the detected faults. The fault detection and correction may be performed based on any suitable technique.

The repair module 106 may also be configured to determine whether one or more of the modifications satisfy one or more of the anti-patterns 109. The repair module 106 may be configured to disallow modifications that may satisfy one or more of the anti-patterns. Additionally or alternatively, the repair module 106 may be configured to perform further testing on the code under test 104, as modified, if the modifications do not satisfy any of the anti-patterns 109. In some embodiments, the further testing may be performed using one or more of the test suites 111. In these or other embodiments, the repair module 106 may be configured to output the code under test 104, as modified, as the modified code under test 108 after implementing one or more modifications with respect to the code under test 104. Additionally or alternatively, the modified code under test 108 may include one or more modifications in which each of the modifications may not satisfy the anti-patterns 109 described above. Further, the modifications may pass one or more other tests of the test suites 111 before the modified code under test 108 is output. In some embodiments, the repair module 106 may be configured to make modifications of the code under test 104 and to output the modified code under test 108 based on one or more operations of a method 300 described below with respect to FIG. 3.

As such, the repair module 106 may be configured to generate the modified code under test 108 with one or more modifications that may repair one or more faults in the code under test 104. The repair module 106 may be configured to generate the modified code under test 108 using a static analysis (e.g., determining whether or not modifications satisfy one or more anti-patterns 109) that may be performed on the modifications prior to a run-time (also referred to as dynamic) analysis with test suites 111 to remove certain types of modifications. Such static analysis before the dynamic analysis may improve the operating efficiency of the repair module 106 as compared to other automated repair techniques, as well as result in the repair system potentially producing correct or better repairs for faults in more instances.

Modifications, additions, or omissions may be made to FIGS. 1A-1F without departing from the scope of the present disclosure. For example, the environment 100 may include more or fewer elements than those illustrated and described in the present disclosure. Further, the code and flow graph examples given with respect to FIGS. 1B-1F are merely examples and are not limiting of the present disclosure. In addition, in some embodiments, one or more routines, one or more instructions, or at least a portion of code of the repair module 106, the anti-patterns 109, the test suites 111, and the repair template 112 may be combined such that they may be considered the same thing or may have common sections that may be considered part of two or more of the repair module 106 the anti-patterns 109, the test suites 111, and the repair template 112.

Figure 2:
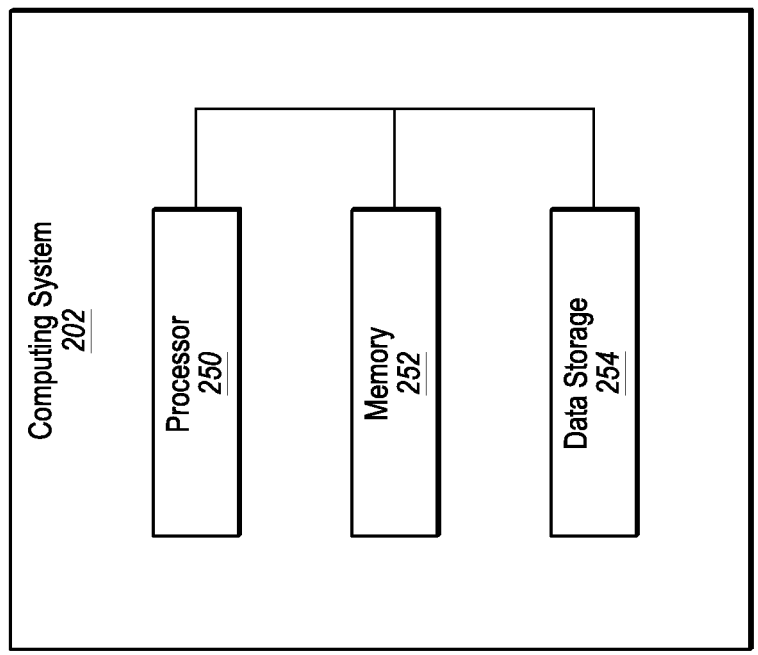
FIG. 2 illustrates an example computing system that may be configured to repair a software program.

FIG. 2 illustrates a block diagram of an example computing system 202, according to at least one embodiment of the present disclosure. The computing system 202 may be configured to implement one or more operations associated with a repair module (e.g., the repair module 106). The computing system 202 may include a processor 250, a memory 252, and a data storage 254. The processor 250, the memory 252, and the data storage 254 may be communicatively coupled.

In general, the processor 250 may include any suitable special-purpose or general-purpose computer, computing entity, or processing device including various computer hardware or software modules and may be configured to execute instructions stored on any applicable computer-readable storage media. For example, the processor 250 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. Although illustrated as a single processor in FIG. 2, the processor 250 may include any number of processors configured to, individually or collectively, perform or direct performance of any number of operations described in the present disclosure. Additionally, one or more of the processors may be present on one or more different electronic devices, such as different servers.

In some embodiments, the processor 250 may interpret and/or execute program instructions and/or process data stored in the memory 252, the data storage 254, or the memory 252 and the data storage 254. In some embodiments, the processor 250 may fetch program instructions from the data storage 254 and load the program instructions in the memory 252. After the program instructions are loaded into memory 252, the processor 250 may execute the program instructions.

For example, in some embodiments, the repair module may be included in the data storage 254 as program instructions. The processor 250 may fetch the program instructions of the repair module from the data storage 254 and may load the program instructions of the repair module in the memory 252. After the program instructions of the repair module are loaded into memory 252, the processor 250 may execute the program instructions such that the computing system may implement the operations associated with the repair module as directed by the instructions.

The memory 252 and the data storage 254 may include computer-readable storage media for carrying or having computer-executable instructions or data structures stored thereon. Such computer-readable storage media may include any available media that may be accessed by a general-purpose or special-purpose computer, such as the processor 250. By way of example, and not limitation, such computer-readable storage media may include tangible or non-transitory computer-readable storage media including RAM, ROM, EEPROM, CD-ROM or other optical disk storage, magnetic disk storage or other magnetic storage devices, flash memory devices (e.g., solid state memory devices), or any other storage medium which may be used to carry or store particular program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 250 to perform a certain operation or group of operations.

Modifications, additions, or omissions may be made to the computing system 202 without departing from the scope of the present disclosure. For example, in some embodiments, the computing system 202 may include any number of other components that may not be explicitly illustrated or described.

Figure 3:
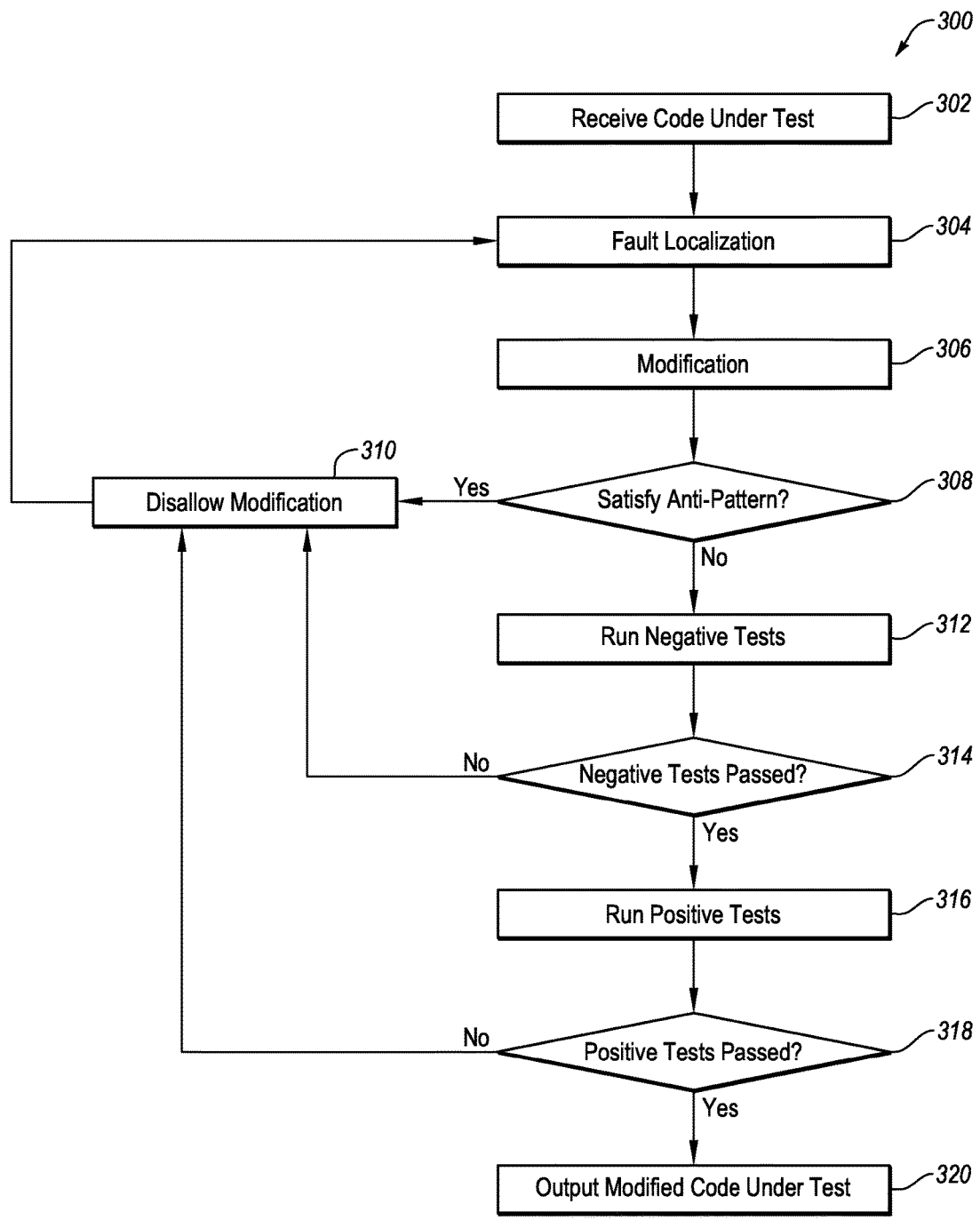
FIG. 3 is a flowchart of an example method of repairing a software program.

FIG. 3 is a flowchart of an example method 300 of repairing a software program, according to at least one embodiment described in the present disclosure. The method 300 may be performed by any suitable system, apparatus, or device. For example, the repair module 106 of FIG. 1 or the computing system 202 of FIG. 2 (as directed by a repair module) may perform one or more of the operations associated with the method 300. Although illustrated with discrete blocks, the steps and operations associated with one or more of the blocks of the method 300 may be divided into additional blocks, combined into fewer blocks, or eliminated, depending on the particular implementation.

The method 300 may begin at block 302, where code under test of a software program may be received. The code under test may be analogous to the code under test 104 described with respect to FIG. 1A. Additionally or alternatively, in some embodiments, a repair template (e.g., the repair template 112 of FIG. 1A), one or more anti-patterns (e.g., the anti-patterns 109 of FIG. 1A) or one or more test suites (e.g., the test suites 111 of FIG. 1A) may be read at block 302.

At block 304, fault localization may be performed with respect to the code under test using any suitable technique. In some embodiments, the fault localization may locate one or more faults in the code under test and may be performed based on application of the one or more test suites to the code under test.

At block 306, one or more modifications may be made to the code under test in response to locating and based on the faults. The modifications may be made based on the repair template. In some embodiments, one or more program representations may be generated with respect to the code under test prior to making the modifications. The program representations may include flow graphs (e.g., a control-flow graph, a data-flow graph, or both), abstract syntax trees, or a copy of the code under test itself.

At block 308, it may be determined whether the modifications satisfy one or more anti-patterns that may indicate whether or not the modifications are improper. For example, the anti-patterns may be based on or may include software program control-flow or data-flow changes such as those described above with respect to FIGS. 1B-1F.

In some embodiments, it may be determined whether or not the modifications satisfy one or more of the anti-patterns based on a comparison between program representations generated with respect to the code under test before and after the modifications.

For example, as indicated above, a first program representation such as a copy of the code under test or such as an abstract syntax tree with respect to the code under test may be generated prior to modification of the code under test. Further, a second program representation such as a copy of the modified code under test or such as an abstract syntax tree with respect to the modified code under test may be generated after modification of the code under test. A comparison of the first program representation with the second program representation may indicate syntactic changes that may correspond to the modifications and that may satisfy one or more anti-patterns.

For example as mentioned above, one or more anti-patterns may be based on or may include syntactic changes that may include: deletion of a "return" statement; deletion of an "exit" statement; deletion of a statement that includes a method call with a name that matches a regular expression; deletion of an "assert" statement; deletion of all statements related to a control-flow graph node; addition of a negation of a predicate of a path condition; addition of a "true" predicate that disables a check of a condition; addition of a "false" predicate that disables a condition; insertion of a return statement in a control-flow block that is not a last statement in the control-flow block; deletion of a variable definition such that a corresponding variable is undefined at its first use; and deletion of an assignment statement of a loop variable inside of a loop when a loop condition of the loop is based on the loop variable. In some embodiments, a static syntactic comparison between the first program representation and the second program representation may be performed to determine whether or not the corresponding modifications satisfy any one of the above syntactic anti-patterns.

In these or other embodiments, it may be determined whether or not the modifications satisfy one or more anti-patterns based on a static analysis that includes generation of flow graphs as program representations. As indicated above, in some embodiments, the anti-patterns may be based on or may include changes in flow graphs such as described above with respect to FIGS. 1B-1F—e.g., a deletion of a control-flow graph exit path; a deletion of a control-flow graph node; an insertion of a control-flow graph return path prior to a return node of a previous control-flow graph, a deletion of an incoming edge of a data-flow node; and breaking of a data-flow loop that includes a first data-flow node and a second data-flow node in which the first data-flow node corresponds to a loop condition statement of a loop of the software program and the second data-flow node corresponds to an assignment statement that is within the loop of the software program and that is related to a variable of the loop condition statement.

By way of example, in some embodiments, a control-flow graph, a data-flow graph, or both may be generated with respect to the code under test prior to implementing one or more modifications as indicated above. In addition, a control-flow graph, a data-flow graph, or both may be generated with respect to the code under test after implementing the modifications. The before and after flow graphs may be compared with each other to determine one or more differences in the flow graphs that may have been caused by the modifications. The differences may be compared with the anti-patterns that may correspond to the flow graphs to determine whether or not the differences satisfy one or more of the anti-patterns. Because the differences may be related to the modifications, determining whether the differences satisfy the anti-patterns may indicate whether or not the modifications satisfy the anti-patterns.

The anti-patterns that may be based on or included changes in flow graphs may also be based on corresponding syntactic changes as described above with respect to FIGS. 1B-1F. As such, in some embodiments, the syntactic analysis (e.g., generation of program representations that include copies of the code under test or abstract syntax trees) or flow graph analysis (e.g., generation of program representations that include control-flow or data-flow graphs) may be used to detect a same modification that may be improper.

The method 300 may proceed from block 308 to block 310 with respect to modifications that satisfy one or more of the anti-patterns. The method 300 may proceed from block 308 to block 312 with respect to modifications that do not satisfy any of the anti-patterns.

As described above, satisfaction of an anti-pattern may indicate that a corresponding modification may be improper. As such, at block 310, modifications that may satisfy one or more of the anti-patterns may be disallowed at block 310. Disallowance of a modification may include deleting or otherwise undoing the modification such that the code under test may be as it was prior to the modification. Following block 310, the method 300 may return to block 304 in some embodiments. Additionally or alternatively, although not explicitly illustrated in FIG. 3, following block 310, the method 300 may return to block 306 in which different modifications may be made with respect to the faults that correspond to the disallowed modifications.

As indicated above, not satisfying any anti-patterns by a particular modification may provide confidence that the particular modification may correspond to a correct repair. As such, further dynamic testing may be performed on the code under test with respect to modifications that may not satisfy any of the anti-patterns. For example, at block 312, negative tests (e.g., test-cases that were failing in the code under test 104, due to the presence of the faults) may be executed to determine whether the modifications repaired the corresponding faults for which they were implemented.

At block 314, it may be determined whether the negative tests were passed. For example, it may be determined whether or not the modifications repaired their corresponding faults. In response to determining that the negative tests were passed, the method 300 may proceed from block 314 to block 316. In response to determining that the negative tests were not passed, the method 300 may proceed from block 314 to block 310.

In these or other embodiments, as another example of further testing, at block 316, positive tests may be performed to determine whether the modifications introduced other faults that may not correspond to the anti-patterns associated with block 308. At block 318, it may be determined whether the positive tests (e.g., test-cases which were passing in the code under test 104, even with the presence of the faults) now continue to pass under the applied modifications.

In response to determining that the positive tests were passed, the method 300 may proceed from block 318 to block 320. In response to determining that the positive tests were not passed, the method 300 may proceed from block 318 to block 310.

At block 320, modified code under test may be output. The modified code under test may include modifications that may not satisfy the anti-patterns and that may pass both positive and negative tests such that the modified code under test may include a repaired version of the code under test that may be received at block 302.

The method 300 may improve the efficiency of software program testing and repair. For example, the determining whether the modifications satisfy the anti-patterns prior to performing the negative or positive testing may reduce the amount of modifications on which the positive or negative testing may be performed. The method may also generate correct or better repairs, in more instances, that may be deemed acceptable by human developers of the software program.

Modifications, additions, or omissions may be made to the method 300 without departing from the scope of the present disclosure. For example, the operations of method 300 may be implemented in differing order. Additionally or alternatively, two or more operations may be performed at the same time. In particular, the order of performing the positive and negative testing may be switched. Additionally or alternatively, the operations associated with blocks 314 and 318 may be switched or combined. Furthermore, the outlined operations and actions are only provided as examples, and some of the operations and actions may be optional, combined into fewer operations and actions, or expanded into additional operations and actions without detracting from the essence of the disclosed embodiments.

In addition, in some embodiments, the method 300 may be performed iteratively in which a single modification may be analyzed at a time. Additionally or alternatively, one or more operations associated with one or more blocks may be performed with respect to multiple modifications at a time.

As indicated above, the embodiments described in the present disclosure may include the use of a special purpose or general purpose computer (e.g., the processor 250 of FIG. 2) including various computer hardware or software modules, as discussed in greater detail below. Further, as indicated above, embodiments described in the present disclosure may be implemented using computer-readable media (e.g., the memory 252 of FIG. 2) for carrying or having computer-executable instructions or data structures stored thereon.

As used in the present disclosure, the terms "module" or "component" may refer to specific hardware implementations configured to perform the actions of the module or component and/or software objects or software routines that may be stored on and/or executed by general purpose hardware (e.g., computer-readable media, processing devices, etc.) of the computing system. In some embodiments, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations or a combination of software and specific hardware implementations are also possible and contemplated. In this description, a "computing entity" may be any computing system as previously defined in the present disclosure, or any module or combination of modulates running on a computing system.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

All examples and conditional language recited in the present disclosure are intended for pedagogical objects to aid the reader in understanding the present disclosure and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. A method comprising:
    generating a first program representation with respect to a software program, the first program representation including one or more of the following: a first control-flow graph and a first data-flow graph;
    locating a fault in the software program using a test suite;
    modifying, using a repair template, the software program in response to locating the fault;
    generating a second program representation with respect to the software program after modifying the software program, the second program representation including one or more of the following: a second control-flow graph and a second data-flow graph;
    detecting a difference in the second program representation with respect to the first program representation based on a comparison between the first program representation and the second program representation;
    comparing the difference in the second program representation with respect to the first program representation against one or more of a plurality of anti-pattern conditions to determine whether the difference satisfies at least one of the plurality of anti-pattern conditions, the plurality of anti-pattern conditions indicating types of modifications that are improper and being based on one or more of the following software program modifications: deletion of a "return" statement; deletion of an "exit" statement; deletion of a statement that includes a method call with a name that matches a regular expression; deletion of an "assert" statement; deletion of all statements related to a control-flow graph node; addition of a negation of a predicate of a path condition; addition of a "true" predicate that disables a check of a condition; addition of a "false" predicate that disables a condition; insertion of a return statement in a control-flow block that is not a last statement in the control-flow block; deletion of a variable definition such that a corresponding variable is undefined at its first use; and deletion of an assignment statement of a loop variable inside of a loop when a loop condition of the loop is based on the loop variable; and
    disallowing the modification of the software program in response to the comparison of the difference against one or more of the plurality of anti-pattern conditions indicating that the difference satisfies at least one of the plurality of anti-pattern conditions.

2. The method of claim 1, wherein the plurality of anti-pattern conditions include a deletion of a control-flow graph exit path.

3. The method of claim 1, wherein the plurality of anti-pattern conditions include a deletion of a control-flow graph node.

4. The method of claim 1, wherein the plurality of anti-pattern conditions include an insertion of a control-flow graph return path prior to a return node of a previous control-flow graph.

5. The method of claim 1, wherein the plurality of anti-pattern conditions include a deletion of an incoming edge of a data-flow node.

6. The method of claim 1, wherein the plurality of anti-pattern conditions include breaking of a data-flow loop that includes a first data-flow node and a second data-flow node in which the first data-flow node corresponds to a loop condition statement of a loop of the software program and the second data-flow node corresponds to an assignment statement that is within the loop of the software program and that is related to a variable of the loop condition statement.

7. Non-transitory computer-readable storage media including computer-executable instructions configured to, in response to execution by one or more processors, cause a system to perform operations, the operations comprising:
    generating a first flow graph with respect to a software program, the first flow graph including one or more of the following: a first control-flow graph and a first data-flow graph;
    locating a fault in the software program using a test suite;
    modifying, using a repair template after generating the first flow graph, the software program in response to locating the fault;
    generating a second flow graph with respect to the software program after modifying the software program, the second flow graph including one or more of the following: a second control-flow graph and a second data-flow graph;
    detecting a difference in the second flow graph with respect to the first flow graph based on a comparison between the first flow graph and the second flow graph; and
    comparing the difference in the second flow graph with respect to the first flow graph against one or more of a plurality of anti-pattern conditions to determine whether the difference satisfies at least one of the plurality of anti-pattern conditions, the plurality of anti-pattern conditions indicating types of modifications that are improper and being based on one or more of the following software program modifications: deletion of a "return" statement; deletion of an "exit" statement; deletion of a statement that includes a method call with a name that matches a regular expression; deletion of an "assert" statement; deletion of all statements related to a control-flow graph node; addition of a negation of a predicate of a path condition; addition of a "true" predicate that disables a check of a condition; addition of a "false" predicate that disables a condition; insertion of a return statement in a control-flow block that is not a last statement in the control-flow block; deletion of a variable definition such that a corresponding variable is undefined at its first use; and deletion of an assignment statement of a loop variable inside of a loop when a loop condition of the loop is based on the loop variable;

determining that the modification is improper based on the comparison of the difference against one or more of the plurality of anti-pattern conditions indicating that the difference satisfies at least one of the plurality of anti-pattern conditions; and disallowing the modification in response to determining that the modification is improper.

8. The non-transitory computer-readable storage media of claim 7, wherein the plurality of anti-pattern conditions include one or more of the following: a deletion of a control-flow graph exit path; a deletion of a control-flow graph node; and an insertion of a control-flow graph return path prior to a return node of a previous control-flow graph.

9. The non-transitory computer-readable storage media of claim 7, wherein the plurality of anti-pattern conditions include one or more of the following: a deletion of an incoming edge of a data-flow node; and breaking of a data-flow loop that includes a first data-flow node and a second data-flow node in which the first data-flow node corresponds to a loop condition statement of a loop of the software program and the second data-flow node corresponds to an assignment statement that is within the loop of the software program and that is related to a variable of the loop condition statement.

10. A system comprising:
one or more processors; and
one or more computer-readable storage media communicatively coupled to the one or more processors and including computer-executable instructions configured to, in response to execution by the one or more processors, cause the system to perform operations, the operations comprising:
generating a first program representation with respect to a software program, the first program representation including one or more of the following: a first control-flow graph and a first data-flow graph;
locating a fault in the software program using a test suite;
modifying, using a repair template, the software program in response to locating the fault;
generating a second program representation with respect to the software program after modifying the software program, the second program representation including one or more of the following: a second control-flow graph and a second data-flow graph;
detecting a difference in the second program representation with respect to the first program representation based on a comparison between the first program representation and the second program representation;
comparing the difference in the second program representation with respect to the first program representation against one or more of a plurality of anti-pattern conditions to determine whether the difference satisfies at least one of the plurality of anti-pattern conditions, the plurality of anti-pattern conditions indicating types of modifications that are improper, the plurality of anti-pattern conditions being based on one or more of the following software program modifications: deletion of a "return" statement; deletion of an "exit" statement; deletion of a statement that includes a method call with a name that matches a regular expression; deletion of an "assert" statement; deletion of all statements related to a control-flow graph node; addition of a negation of a predicate of a path condition; addition of a "true" predicate that disables a check of a condition; addition of a "false" predicate that disables a condition; insertion of a return statement in a control-flow block that is not a last statement in the control-flow block; deletion of a variable definition such that a corresponding variable is undefined at its first use; and deletion of an assignment statement of a loop variable inside of a loop when a loop condition of the loop is based on the loop variable; and
disallowing the modification of the software program in response to the comparison of the difference against one or more of the plurality of anti-pattern conditions indicating that the difference satisfies at least one of the plurality of anti-pattern conditions.

11. The system of claim 10, wherein the plurality of anti-pattern conditions include one or more of the following: a deletion of a control-flow graph exit path; a deletion of a control-flow graph node; an insertion of a control-flow graph return path prior to a return node of a previous control-flow graph; a deletion of an incoming edge of a data-flow node; and breaking of a data-flow loop that includes a first data-flow node and a second data-flow node in which the first data-flow node corresponds to a loop condition statement of a loop of the software program and the second data-flow node corresponds to an assignment statement that is within the loop of the software program and that is related to a variable of the loop condition statement.

* * * * *